Patented Sept. 15, 1953

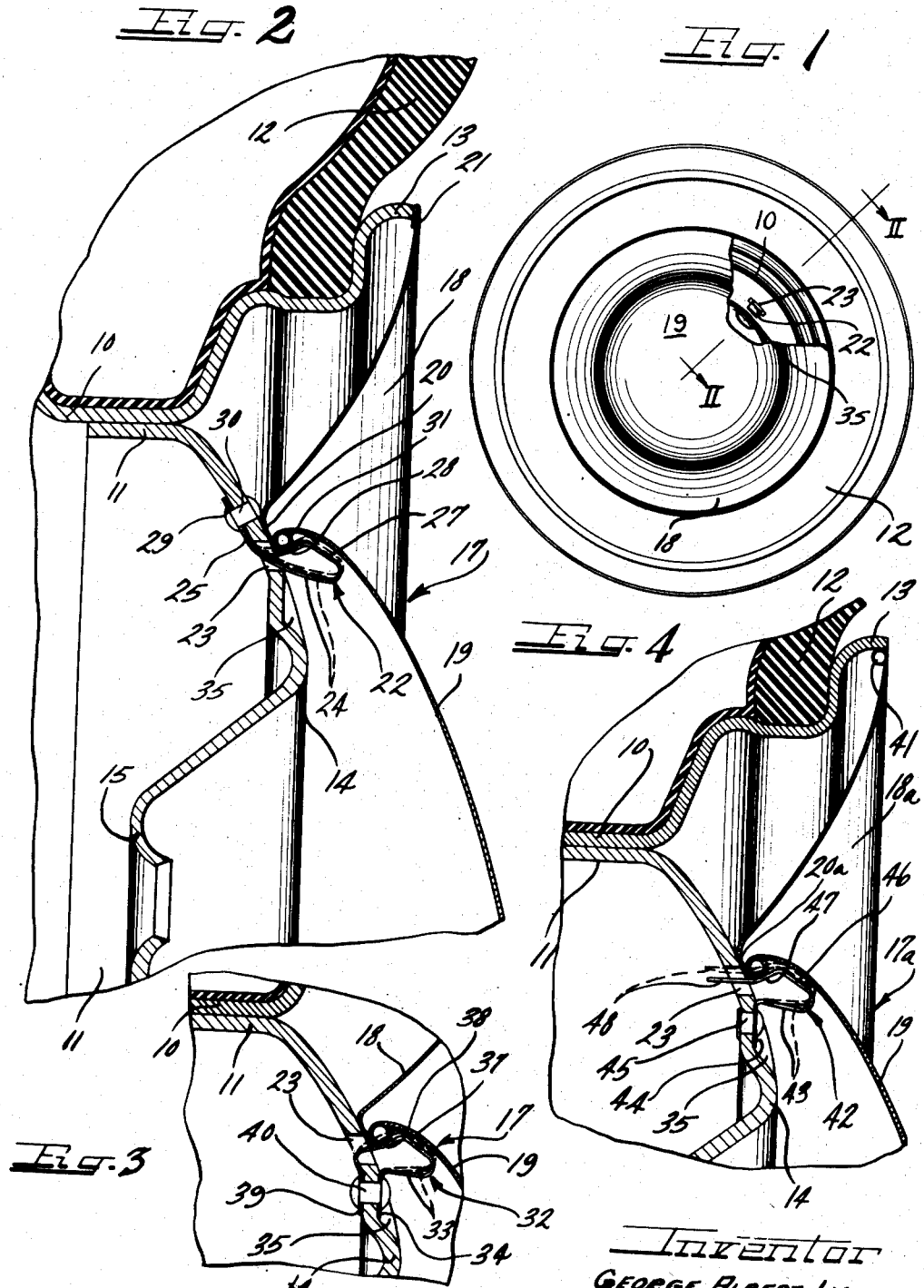

2,652,287

UNITED STATES PATENT OFFICE 2,652,287

WHEEL STRUCTURE

George Albert Lyon, Detroit, Mich.

Application May 26, 1947, Serial No. 750,490

11 Claims. (Cl. 301—37)

This invention relates to improvements in wheel structures and more particularly concerns means for covering the outer side of a vehicle wheel.

An important object of the present invention is to provide an improved wheel structure and a cover assembly separably mounted on the wheel in a novel manner.

Another object of the invention is to provide in a wheel structure improved cover means and cover retaining means.

A further object of the invention is to provide in a wheel structure an improved separable multi-part cover assembly and means for detachably retaining the assembly on the wheel.

Still another object of the invention is to provide improved retaining means for detachably attaching a cover to the outer side of a vehicle wheel.

According to the general features of the invention, there is provided a wheel structure including a tire rim and a load sustaining body part, the body part being formed from stamped sheet metal and having an annular series of apertures therethrough near but spaced from the juncture with the tire rim, cover retaining spring clips being secured to the wheel body adjacent to the respective apertures with a portion of each of the clips extending through the associated aperture and a retaining loop portion extending generally axially outwardly from the wheel body and formed with a generally radially outwardly and axially inwardly facing cover retaining shoulder toward which each of the clips is strongly resiliently biased, and a cover member having a marginal formation retainingly engaging said retaining shoulder on the clips.

According to another feature of the invention the spring clips comprise closed loops with the ends juxtaposed and providing the portion extending through the respective apertures and secured to the wheel body at the axially inner side of the wheel body.

According to another feature of the invention the spring clips each have a pair of terminal flange portions one of which is secured on the axially outer side of the wheel body and the other of which is on the portion of the clips extending through the respective apertures and is secured to the axially inner side of the wheel body.

According to still another feature of the invention the portions of the spring clips which extend through the apertures in the wheel body are respectively free terminal portions, and the axially outer portions of the clips have respective terminal flanges secured to the wheel body and merging with axially extending tensioning lever portions cooperating to maintain the shoulder portions under strong cover retaining resilient bias.

It is another feature of the invention to provide a vehicle wheel structure including a tire rim and a load sustaining body part, a trim ring cover member for substantially concealing the outer side of the tire rim and extending radially inwardly to the wheel body, the inner margin of the trim ring having a generally radially inwardly extending flange bearing against the wheel body, an annular series of strongly biased retaining springs engaging the edge of said flange for holding the trim ring on the wheel and centered, and a hub cap cover member retainingly engaging said spring clips and having the edge thereof bearing against and clamping said trim ring inner marginal flange against the wheel body.

Other objects, features and advantages of the present invention may be readily apparent from the following detailed description of certain preferred embodiments thereof taken in conjunction with the accompanying drawings wherein:

Fig. 1 is a side elevational view of a wheel embodying the features of the present invention showing the cover partially broken away to reveal certain details of structure;

Fig. 2 is an enlarged radial sectional detail view taken substantially on the line II—II of Fig. 1;

Fig. 3 is a fragmentary sectional elevational view taken on a similar plane as Fig. 2 but showing a modified form of the invention; and Fig. 4 is a radial sectional view similar to Fig. 2 but showing a further modified form of the invention.

As shown on the drawings:

Having reference first to Figs. 1 and 2, a vehicle wheel with which the present invention is adapted to be used comprises a tire rim 10 and a wheel body 11, both of these members being formed from suitable sheet metal, the tire rim being a rolled section and the wheel body a stamping.

The tire rim 10 may be of conventional multi-flanged formation for receiving a drop center type of pneumatic tire assembly 12. At its outer extremity, the tire rim has a terminal flange 13.

At its outer periphery the wheel body 11 is appropriately secured to the base flange of the tire rim 10. Intermediately the wheel body is preferably formed with a generally axially outwardly protruding annular reenforcing nose bulge 14 which defines a dished central bolt-on flange formation 15.

Ornamentally and protectively covering the outer side of the wheel is a cover assembly 17 which comprises a trim ring member 18 and a hub cap member 19. If preferred, the hub cap 19 alone may be used.

The trim ring member 18 is preferably of a radial expanse and magnitude to extend from the terminal flange 13 of the tire rim radially and axially inwardly to the wheel body 11 at the radially outer side of the nose bulge 14. By preference, the outer side of the trim ring 18 is formed on a convex contour on a curvature generally simulating the side wall curvature of the tire 12 and where the outer side of the wheel trim member is light colored or finished in white, it simulates a white side wall portion of a massive tire in the tire rim 10. At its inner margin, the trim ring member 18 is formed with an integral generally radially inwardly and slightly axially outwardly extending abutment flange 20 which is formed at an angle generally complementary to the engaged portion of the wheel body 11 and is seated on the wheel body. At its outer margin, the trim ring member 18 is preferably formed with an inturned reenforcing flange 21.

A centered, detachable retained relation of the trim ring 18 on the wheel is effected through the medium of a series of retaining clip members 22 which are carried by the wheel body 11. There may be as many of the clip members 22 as desired disposed in annular series about the radially outer side of the nose portion 14 as desired, three to five of such clip members being desirable, depending upon the size of the wheel.

Herein each of the clip members 22 is preferably of such formation that a portion thereof is adapted to extend through a clip aperture 23 provided therefor in the radially outer side of the nose portion 14, such portion being secured to the axially inner side of the wheel body, while the remaining portion of the clip member extends generally axially outwardly and provides a cover retaining spring loop. To this end, the clip member 22 comprises a spring lever body leg 24 having an attachment terminal flange 25 at one end and at its other end being turned to merge with a cam flange portion 27 which in turn merges with a cover retaining shoulder 28 having an attachment terminal flange 29. The terminal flanges 25 and 29 are juxtaposed in face to face relation and then secured as by means of a rivet 30 to the axially inner face of the wheel body at the radially inner side of the clip aperture 23.

In the untensioned condition of the clip 22, it assumes substantially the position indicated in broken outline in Figure 2 with the lever leg 24 clearing the radially inner side of the aperture 23, the cam flange extending obliquely axially inwardly and radially outwardly and facing generally radially outwardly, and the shoulder flange portion 28 facing generally axially inwardly and radially outwardly and extending obliquely radially inwardly and axially inwardly. The base or radially innermost portions of the shoulder flange portion 28 is disposed on a circle which is slightly greater than the radially innermost edge of the trim ring inner marginal flange 20. Thereby, when the trim ring member 18 is to be applied to the wheel, it is moved axially inwardly until the flange 20 engages the cam flange portion 27 of the several clips and then by inward pressure the flange 20 is snapped behind the shoulder 28 which engages the edge of the flange 20 and holds the same in assembled relation with the wheel and centered thereon. Since the flange 20 is relatively thin and engages the shoulder 28 adjacent the base or axially inner end thereof, the clip will be deflected only slightly radially inwardly when the trim ring is applied to the wheel.

The construction and arrangement of the clips 22 and of the hub cap member 19 is such that when the hub cap 19 is applied to the wheel, a marginal reenforcing and attachment bead 31 on the hub cap deflects the respective clips 22 generally radially inwardly substantially as shown in full outline in Figure 2 and thereby places the clip under relatively strong resilient tension so that the clip retaining shoulder 28 of each clip, after the hub cap bead 31 has been snapped therebehind reacts strongly against the bead 31 not only to hold the hub cap on the wheel but also to cam the same hard against the interposed portion of the inner marginal trim ring flange 20 so that the latter is clamped against the adjacent portion of the wheel body.

By preference, the radially inner edge defining the aperture 23 is so related to the clip 22 that in the fully tensioned hub cap retaining condition of the clip the lever leg 24 of the clip may bear against such edge and backed up thereby tend to increase the holding tensioned spring bias of the clip.

Another important factor in rendering the clip 22 strongly resiliently biased into holding relation to the hub cap bead 31 is the fact that both of the terminal portions of the clip are solidly anchored to the wheel body and the deflectional distorsion effected by the hub cap bead 31 upon the loop of the clip not only places the lever leg 24 under a strong spring load but also the shoulder flange portion 28 and the cam flange portion 27. The result is an unusually strong retaining grip on the cover components.

In removing the hub cap member 19, a pry-off tool is applied behind the inturned marginal reenforcing and attachment bead 31 of the hub cap in the space provided between the edge of the hub cap and the radially inner portion of the trim ring 18 where it merges with the inner marginal flange 20.

Should it be desired to remove the trim ring member 18, that can be effected by forcing the same axially outwardly past the retaining clips 22 as by applying a pry-off tool either behind the inner marginal flange 20 after the hub cap has been removed or behind the outer marginal flange 21.

Should it be desired to use the hub cap 19 without the trim ring member 18, that can be done and in such case the hub cap 19 effectively conceals the clip apertures 23 and the clips 22.

In the modified form shown in Fig. 3, the wheel structure and the cover are the same as in the form of Figs. 1 and 2, but a slightly different form of clip 32 is utilized. Such clip includes a main body or lever leg 33 extending generally axially outwardly from the wheel body 11 and formed with a generally radially inwardly extending attachment terminal flange 34 which engages the outer side of the nose portion 14 within a depression 35 provided therefor. At its axially outer end the leg 33 extends in rounded merger with an oblique generally radially outwardly and axially inwardly extending cam flange portion 37 which in turn merges with a generally radially inwardly and axially inwardly obliquely extending cover retaining cam shoulder portion 38. The shoulder portion 38 extends through the clip aperture 23 in the wheel body and has a generally radially inwardly extending attachment terminal flange portion 39 which engages the axially inner face of the nose portion 14 in general registration with the outer attachment flange 34. A rivet 40 secures the flanges fixedly to the intervening portion of the wheel body. In the untensioned condition of the clip, it assumes the position substantially as shown in broken outline in Fig. 3.

When the cover 17 is applied, the clip 32 assumes a position substantially as shown in full outline wherein the body lever leg 33 is deflected radially inwardly as well as the shoulder flange portion 38 and the cam flange portion 37, all of which cooperate to build up a substantial resilient tension or load working against the engaged marginal portions of the trim ring and hub cap cover members 18 and 19. Similarly as in the previously described form of the clip, the hub cap 19 may be applied to the wheel without the trim ring 18 and in such event the hub cap substantially conceals the apertures 23 through which portions of the clips extend, and entirely conceals the clips and effectively covers over the central portion of the wheel including the nose portion 14 of the wheel body.

In the modification of Figure 4, the wheel is shown as being substantially the same as in Figures 2 and 3, and hence the same reference numerals are applied thereto. The wheel cover, identified as 17a, comprises a trim ring cover member 18a having an inner marginal flange 20a and being of substantially the same formation as the trim ring 18 except that at the radially outer margin thereof it is formed with an inturned reenforcing bead 41 which describes an outer diameter smaller than the radially inner side diameter of the terminal flange 13 of the tire rim so that the outer margin of the trim ring cover member 18a lies flush within the plane of the outer edge of the terminal flange 13.

In the form of Figure 4, a modified clip 42 is utilized having a main body or leverage leg 43 formed with a base flange 44 extending generally radially and secured as by means of a rivet 45 to the outer face of the nose portion 14 in the wheel body within the depression 35 provided for this purpose in the nose portion. From the attachment flange 44, the leverage leg 43 extends axially outwardly and merges on a rounded junction with an oblique generally axially inwardly and radially outwardly extending cam flange portion 46 which in turn merges with a generally radially inwardly and axially inwardly oblique retaining shoulder portion 47 having an axially inwardly extending elongated terminal flange 48 which extends freely through the clip aperture 23 in the wheel body.

In the untensioned condition of the clip 42, the free terminal flange 48 may rest against the radially outer edge defining the clip opening 23. Then, when the cover members 18a and 19 are applied to the wheel, the various portions of the clip are resiliently deflected and placed under tension substantially as shown in full outline so that the retaining shoulder portion 47 strongly bears against the marginal portions of the cover members and thoroughly retains the cover assembled on the wheel. As in the previously described forms, the hub cap 19 may be applied to the wheel separate from the trim ring member 18a, if desired. Pry-off removal of the cover is effected in substantially the same manner as described in connection with Figs. 2 and 3.

In each form of the clip, the portion thereof which extends through the clip aperture is restrained by the limitations of the edges defining the aperture against turning out of operative position although but a single rivet is used in attaching the clip so that it might otherwise have a tendency to turn about the pivot of the rivet. In every instance the clip is so related to the engaged marginal portion of the hub cap cover member that the hub cap is held quite securely. When the hub cap is removed, the trim ring remains securely in place on the wheel and is held centered by the clips.

I claim as my invention:

1. In a wheel structure including a tire rim and a load sustaining body part, the body part being formed from stamped sheet metal and having an annular series of apertures therethrough near but spaced from the juncture with the tire rim, cover retaining spring clips each of which has a pair of adjacent leg portions secured to the wheel body by rivet means adjacent to the respective apertures with at least a portion of each of the clips extending through the associated aperture and a retaining loop portion extending generally axially outwardly from the wheel body and formed with a generally radially outwardly and axially inwardly facing cover retaining shoulder toward which each of the clips is strongly resiliently biased, and a cover member having a marginal formation retainingly engaging said retaining shoulder on the clips.

2. In a wheel structure including a tire rim and a load sustaining body part, the body part being formed from stamped sheet metal and having an annular series of apertures therethrough near but spaced from the juncture with the tire rim, cover retaining spring clips being secured to the wheel body adjacent to the respective apertures with a portion of each of the clips extending through the associated aperture and a retaining loop portion extending generally axially outwardly from the wheel body and formed with a generally radially outwardly and axially inwardly facing cover retaining shoulder toward which each of the clips is strongly resiliently biased, and a cover member having a marginal formation retainingly engaging said retaining shoulder on the clips, the spring clips comprising closed loops with the ends juxtaposed and providing the portion extending through the respective apertures and secured to the wheel body at the axially inner side of the wheel body.

3. In a wheel structure including a tire rim and a load sustaining body part, the body part being formed from stamped sheet metal and having an annular series of apertures therethrough near but spaced from the juncture with the tire rim, cover retaining spring clips being secured to the wheel body adjacent to the respective apertures with a portion of each of the clips extending through the associated aperture and a retaining loop portion extending generally axially outwardly from the wheel body and formed with a generally radially outwardly and axially inwardly facing cover retaining shoulder toward which each of the clips is strongly resiliently biased, and a cover member having a marginal formation retainingly engaging said retaining shoulder on the clips, the spring clips each having a pair of terminal flange portions one of which is secured on the axially outer side of the wheel body and the other of which is on the portion of the clips extending through the respective apertures and is secured to the axially inner side of the wheel body.

4. In a wheel structure including a body portion having a clip aperture therethrough, a cover retaining clip having a pair of terminal portions secured to the axially inner face of the wheel body spaced from the aperture and extending generally axially outwardly through said aperture and having a connecting loop including a cover retaining shoulder at the axially outer side of the wheel body.

5. In a wheel structure including a load sustaining body part, said body part having a wheel opening therein spaced from the radially outer margin of the wheel body, a cover retaining clip comprising a resilient metal loop having the loop portion thereof at the axially outer side of the body portion of the wheel and having juxtaposed terminal portions extending through said aperture and projecting generally radially outwardly and secured to the axially inner side of the wheel body portion.

6. In a wheel structure including a load sustaining body member, said member having a cover retaining clip aperture therethrough, and a cover retaining clip having a cover-retaining spring loop at the axially outer side of the wheel body member and including a pair of terminal flanges, one of said flanges being secured to the axially outer side of the wheel body and the other of said flanges extending from a portion of the clip loop which projects through the clip aperture, said other terminal flange being secured to the axially inner side of the wheel body member.

7. In combination in a wheel structure of the character described, a wheel body member, a cover retaining clip having a cover engaging loop and a pair of terminal flanges disposed in generally spaced parallel relation, said terminal flanges being disposed on respective opposite sides of an intervening portion of the body member and secured to the body member.

8. In a wheel structure including a tire rim and a load sustaining body part, the body part including a generally axially outwardly extending annular reenforcing nose portion, an annular series of equally spaced clip apertures in the radially outer side of the nose portion spaced substantially radially inwardly from the radially outer margin of the body part, cover retaining clips having juxtaposed portions secured to the inner face of the wheel body spaced from the respective apertures and extending through said apertures and including cover retaining loops at the axially outer side of the body part, said loops including axially outwardly extending tensioning lever portions, radially outwardly and axially inwardly obliquely extending cam portions merging with the axially outer ends of the lever portions, and generally radially inwardly and axially inwardly obliquely extending cover retaining shoulders at the axially inner ends of the cam portions, and a hub cap member having an inturned marginal bead retainingly engaging said retaining shoulders and maintaining the clips under radially inward resilient tension, the cam portions of the clips lying in closely spaced relation to the adjacent marginal portion of the hub cap member in the fully mounted position of the hub cap member.

9. In a wheel structure including a tire rim and a load sustaining body part, the body part including a generally axially outwardly extending annular reenforcing nose portion, an annular series of equally spaced clip apertures in the radially outer side of the nose portion spaced substantially radially inwardly from the outer margin of the body part, cover retaining clips having portions extending through said apertures and secured to the face of the body part spaced from the respective apertures and including cover retaining loops at the axially outer side of the body part, said loops including axially outwardly extending tensioning lever portions, radially outwardly and axially inwardly obliquely extending cam portions merging with the axially outer ends of the lever portions, and generally radially inwardly and axially inwardly obliquely extending cover retaining shoulders at the axially inner ends of the cam portions, a hub cap member having an inturned marginal bead retainingly engaging said retaining shoulders and maintaining the clips under radially inward resilient tension, the cam portions of the clips lying in closely spaced relation to the adjacent inner marginal face portion of the hub cap member in the fully mounted position of the hub cap member, and a trim ring cover member extending in substantially concealing relation to the tire rim and having an inner marginal flange clamped between said bead on the hub cap and the adjacent portion of the wheel body.

10. In combination in a wheel structure of the character described, the wheel structure including a sheet metal body member including an annular outwardly bulged reinforcing nose rib of generally arcuate cross section, said nose rib having spaced substantially radially inwardly from the outer margin of the body member but disposed at the radially outer side of the rib an inset depression and an aperture therethrough contiguous the radially outer side of the depression, and a cover retaining spring clip having a base flange, said base flange being secured in said depression, and the clip having a loop portion projecting generally axially outwardly from the nose rib at the radially outer end of said base flange and the radially inner side of said aperture for retaining engagement with a cover member, said clip having a part of said loop portion projecting through said aperture.

11. In a wheel structure including a wheel body having an aperture spaced radially inwardly from its outer margin, said aperture being defined by a generally radially extending portion of the wheel body, a cover retaining spring clip formed from a metal strip having a retaining loop portion and a pair of terminal flanges, said terminal flanges being secured fixedly in parallel relation to said generally radially extending portion of the wheel body and with the loop portion projecting angularly axially outwardly relative to said terminal flanges and the wheel body, said loop portion being resiliently flexible generally radially in the application or removal of a cover member retained thereby.

GEORGE ALBERT LYON.

References Cited in the file of this patent

UNITED STATES PATENTS

| Number    | Name | Date           |
|-----------|------|----------------|
| 2,158,126 | Horn | May 16, 1939   |
| 2,196,718 | Ash  | Apr. 9, 1940   |
| 2,214,746 | Lyon | Sept. 17, 1940 |
| 2,298,669 | Wood | Oct. 13, 1942  |
| 2,304,583 | Lyon | Dec. 8, 1942   |
| 2,333,626 | Aske | Nov. 9, 1943   |
| 2,343,070 | Lyon | Feb. 29, 1944  |
| 2,368,254 | Lyon | Jan. 30, 1945  |
| 2,470,559 | Horn | May 17, 1949   |